(12) United States Patent
Fukuda

(10) Patent No.: US 6,988,659 B2
(45) Date of Patent: Jan. 24, 2006

(54) CARD READER

(75) Inventor: Osamu Fukuda, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/890,207

(22) Filed: Jul. 14, 2004

(65) Prior Publication Data
US 2005/0011949 A1  Jan. 20, 2005

(30) Foreign Application Priority Data
Jul. 15, 2003  (JP) .............................. 2003-274525

(51) Int. Cl.
G06K 7/06 (2006.01)

(52) U.S. Cl. .................. 235/441; 235/479; 235/492; 439/630; 439/160; 439/159

(58) Field of Classification Search ............... 235/441; 439/159, 155, 325, 630, 157, 67; 257/368
See application file for complete search history.

(56) References Cited

U.S. PATENT DOCUMENTS

| 4,952,161 | A | * | 8/1990 | Komatsu | 439/155 |
| 6,709,278 | B2 | * | 3/2004 | Liu | 439/67 |
| 2001/0052622 | A1 | * | 12/2001 | Inoue | 257/368 |
| 2002/0004327 | A1 | * | 1/2002 | Nishioka | 439/159 |
| 2002/0070274 | A1 | * | 6/2002 | Lee | 235/441 |
| 2002/0185533 | A1 | * | 12/2002 | Shieh et al. | 235/441 |
| 2004/0005799 | A1 | * | 1/2004 | Okabe | 439/157 |
| 2004/0029446 | A1 | * | 2/2004 | Ooya et al. | 439/630 |
| 2004/0072460 | A1 | * | 4/2004 | Conway et al. | 439/325 |
| 2004/0173678 | A1 | * | 9/2004 | Wu | 235/441 |
| 2004/0235325 | A1 | * | 11/2004 | Iijima | 439/159 |
| 2004/0242040 | A1 | * | 12/2004 | Miyazawa et al. | 439/159 |

FOREIGN PATENT DOCUMENTS

JP  3080713 U  7/2001

* cited by examiner

Primary Examiner—Diane I. Lee
Assistant Examiner—Allyson N Trail
(74) Attorney, Agent, or Firm—Sughrue Mion, PLLC

(57) ABSTRACT

The housing of a card reader has a connector to be inserted into an electronic equipment. When using a moving member movable in the inserting and removing directions (inserting direction and removing direction) of the connector and inserting the connector into the housing of the electronic equipment, the moving member is pushed by the circumferential portion of the counterpart connector of the electronic equipment connecting to the connector and moved in the removing direction of the connector to prevent a medium from being removed.

5 Claims, 7 Drawing Sheets

CARD READER

BACKGROUND OF THE INVENTION

1. Field of the Invention

The present invention relates to a card reader, particularly to a card reader whose housing has a connector to be electrically connected with an electronic equipment such as a personal computer.

2. Description of the Related Art

A card reader is conventionally known which is obtained by constituting a USB (Universal Serial Bus) connector to be inserted into an electronic equipment such as a personal computer, a medium housing portion into which a medium such as a memory card is inserted, and a circuit which transfers the data stored in the medium to an electronic equipment by one housing. Moreover, a card reader is proposed which is obtained by fitting a USB connector into a circular axis case so that the USB connector can be rotated (Japanese Utility Model Registration No. 3080713).

SUMMARY OF THE INVENTION

In the case of a conventional card reader, when a medium is removed from the card reader during an access to the medium, the so-called hot plug of the medium can be made. Therefore, a problem occurs that the data in the medium or the medium is broken due to the hot plug of the medium.

The present invention is made to solve the above problem and its object is to provide a card reader capable of preventing the data in a medium or the medium from being broken due to hot plug of the medium from the card reader.

To achieve the above object, the first aspect of the present invention uses a card reader whose housing has a connector, in which a moving member movably set in the directions same as the inserting and removing directions of the connector is included and the moving member moves by being pushed by the circumferential portion of a counterpart connector to be connected with the connector when the connector is inserted to prevent the medium set in the housing from being removed.

According to first aspect of the present invention, when inserting a connector of a card reader into an electronic equipment, a moving member is pushed by the circumferential portion of the counterpart connector of the electronic-equipment, the moving member is moved and thereby, a medium cannot be removed, and hot plug of the medium from the card reader is prevented.

Moreover, the second aspect of the present invention is constituted so that the moving member prevents the medium from being removed by holding a corner portion or one side of the medium in the first aspect.

According to the above configuration, even for a small card reader having a simple configuration, a medium is securely held by a moving member and hot plug of the medium from the card reader is prevented.

The third aspect of the present invention is further provided with an urging device which urges the moving member in the inserting direction of the connector, in which the moving device is moved due to urging by the urging device when removing the connector so that the medium set in the housing can be removed in the first or second aspect.

According to the above configuration, when removing a connector of a card reader from an electronic equipment, a moving member is moved due to urging by an urging device and a medium can be removed.

The fourth aspect of the present invention is further provided with a medium-lock detecting portion which detects locked state and the lock cancelled state of the medium by the moving member, and connecting a power supply line to the medium in the locked state and disconnecting the power supply line from the medium in the lock cancelled state in the third aspect.

According to the above configuration, hot plug of a medium is securely prevented because power is supplied to the medium when the medium is locked but power is not supplied to the medium when medium lock is cancelled.

The fifth aspect of the present invention is further provided with a medium-lock detecting portion which detects the locked state and lock cancelled state of the medium by the moving member, electrically connecting a control line for access control to the medium in the locked state, and electrically disconnecting the control line in the lock cancelled state in the third aspect.

According to the above configuration, a medium is securely protected because it is possible to access the medium when the medium is locked and it is impossible to access the medium when medium lock is cancelled.

According to the present invention, it is possible to prevent the data in a medium or the medium from being broken due to hot plug of the medium from a card reader.

DETAILED DESCRIPTION OF THE PREFERRED EMBODIMENTS

Figure 1:
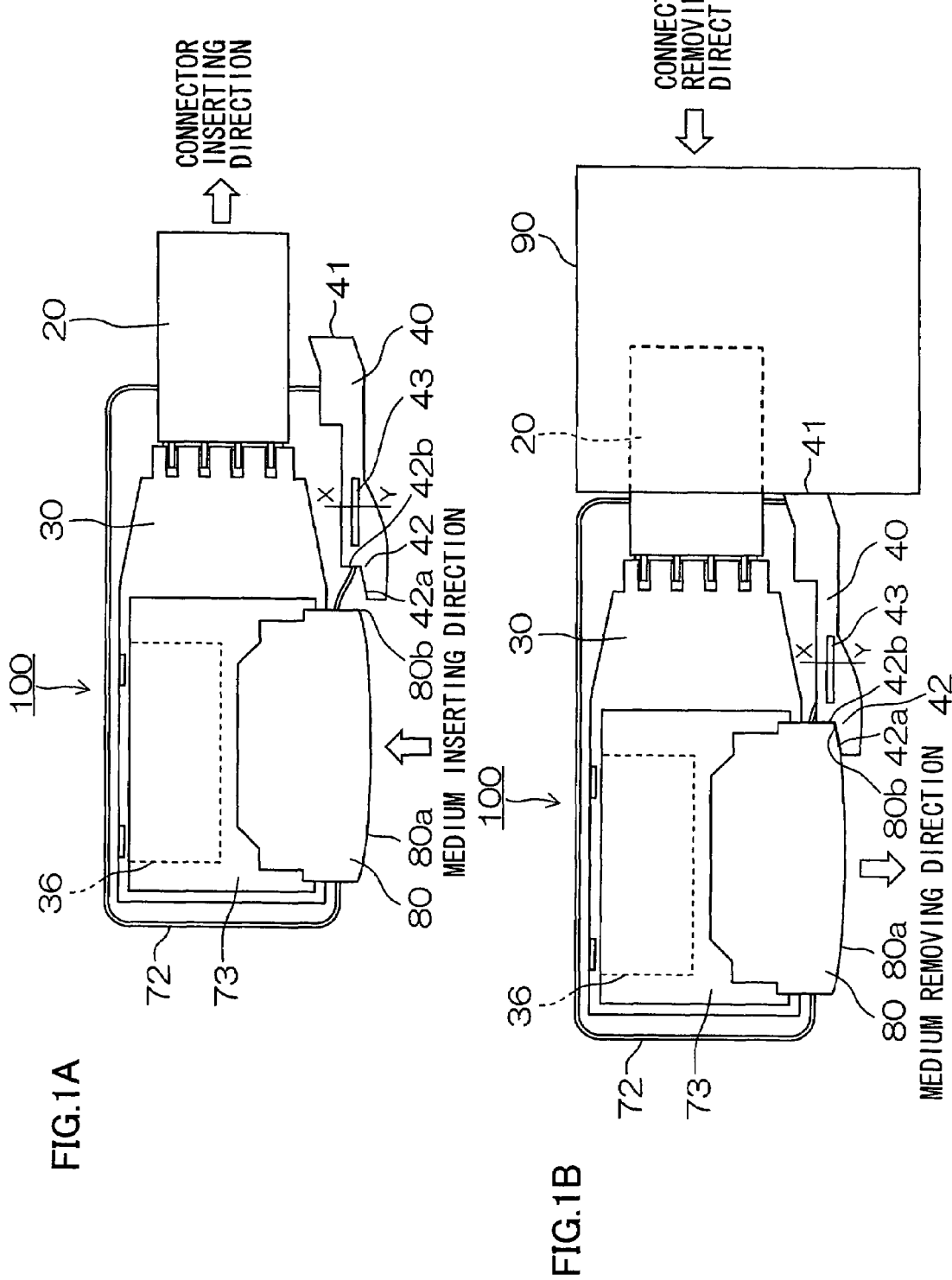
FIGS. 1A and 1B are top views showing a card reader of first embodiment of the present invention.

Preferred embodiments of a card reader of the present invention are described below by referring to the accompanying drawings.

(First Embodiment)

FIGS. 1A and 1B are top views showing the card reader 100 of the first embodiment of the present invention. In the case of the card reader 100, a card-like medium 80 which stores data such as image data is removable. Moreover, the card reader 100 is removable from an electronic equipment 90 such as a personal computer. FIG. 1A shows a state in which the card reader 100 is not set to the electronic equipment 90 and FIG. 1B shows a state in which the card reader 100 is set to the electronic equipment 90. In the state in which the card reader 100 is set to the electronic equipment 90 shown in FIG. 1B, the card reader 100 and electronic equipment 90 are connected by a USB (Universal Serial Bus). FIGS. 1A and 1B show states in which a first cover to be connected with a second cover 72 is removed and the second cover 72 is left for explanation. In fact, however, not-illustrated first cover and second cover 72 are mutually connected.

A part of a USB connector 20 is protruded from the housing of the card reader 100 and the protruded portion is inserted into the housing of the electronic equipment 90 and fitted to a counterpart connector (not illustrated) of the electronic equipment 90. The USB connector 20 has a plurality of connection terminals corresponding to USB lines (Vbus, D+, D−, and GND) respectively.

A medium storing portion 73 controls the upside, downside, and three sides of the medium 80 set to the card reader 100. One curved side 80a of the medium 80 is exposed from the housing.

Various circuits necessary for data transfer between the medium 80 and electronic equipment 90 are formed on a circuit board 30. The USB connector 20 is directly connected to the circuit board 30.

A medium connecting portion 36 has a plurality of connection terminals corresponding to a power supply line which supplies power to the medium 80, a data bus which transmits data, and a control bus (control line) which controls an access to the medium 80 respectively.

A locking key 40 is a member which prevents the medium 80 from being removed from the housing of the card reader 100 in a state in which the USB connector 20 is inserted in the housing of the electronic equipment 90. One end of the locking key 40 is set nearby the USB connector 20 to serve as a contact portion 41 abutting on the circumferential portion of the counterpart connector of the electronic equipment 90 and the other end of the locking key 40 is set nearby the inserting port of the medium storing portion 73 to serve as a holding claw 42 for holding a side of the medium 80 so that the medium 80 is not removed. The holding claw 42 is set almost vertically to the inserting and removing directions of the medium 80 and has L-shaped control faces (42a and 42b) constituted by a first control face 42a which controls one curved side 80a of the medium 80 and a second control face 42b parallel with the inserting and removing directions of the medium 80 so as to hold an L-shaped corner portion 80b of the medium 80. The medium 80 shown in FIGS. 1A and 1B is formed into an asymmetric shape in order to prevent the medium 80 from being erroneously inserted. The holding claw 42 of the locking key 40 is formed so that the angle formed between the first control face 42a and the second control face 42b is equal to the angle (slightly larger than 90°) of the corner portion 80b of the medium 80 correspondingly to the asymmetric shape of the medium 80.

Figure 2:
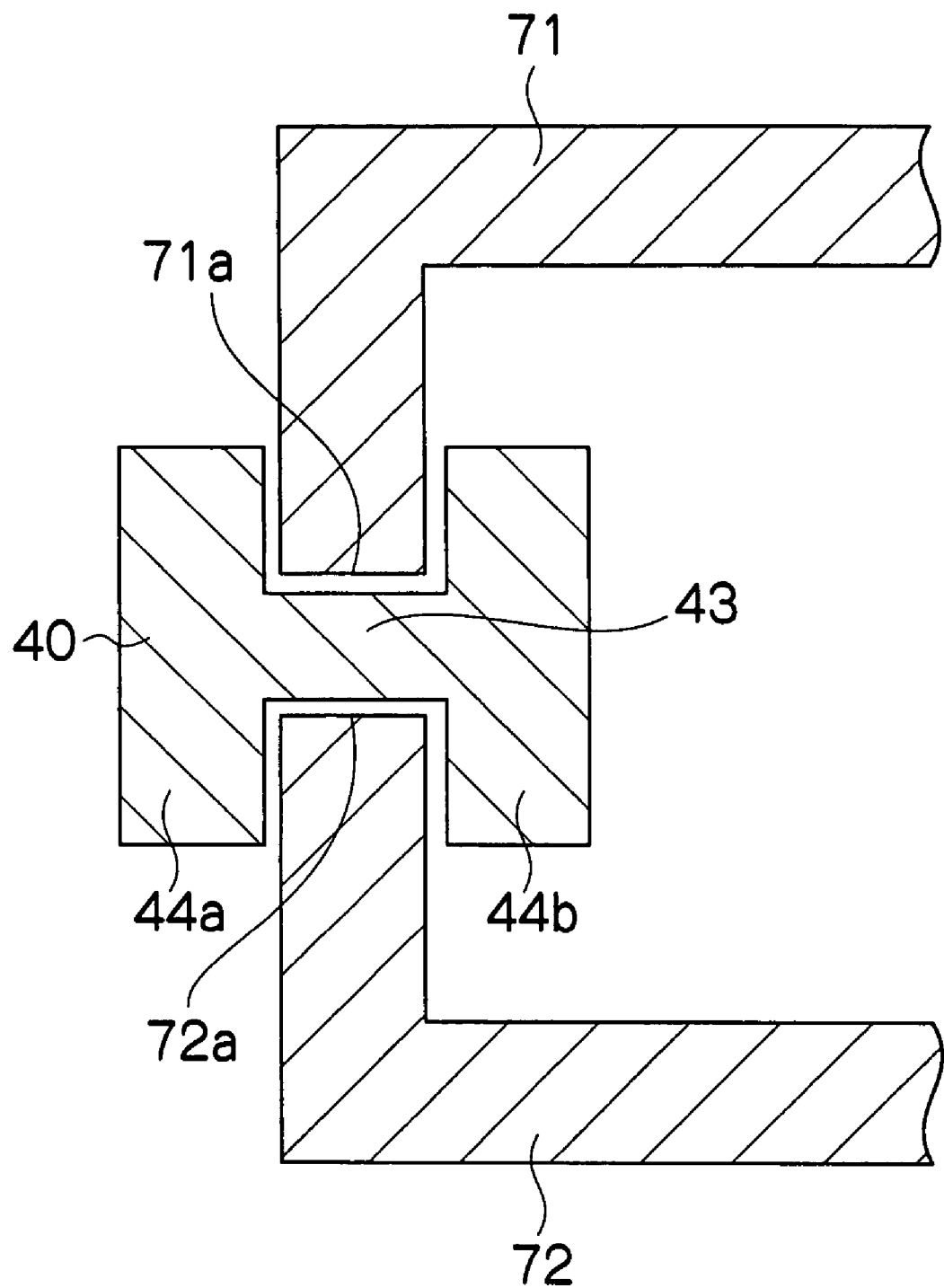
FIG. 2 is a sectional view of a locking key which explains slide of the locking key.

Moreover, the locking key 40 has a sliding portion 43 which slides the locking key 40 in the directions same as the inserting and removing directions of the USB connector 20 and flanges 44a and 44b for preventing the locking key 40 from being removed from slits (71a and 72a) in the slits (71a and 72a) formed by an end face 71a of a first cover 71 and an end face 72a of a second cover 72 as shown in FIG. 2 which is an X-Y sectional view.

In the case of the locking key 40 thus formed, when the USB connector 20 is inserted into the housing of the electronic equipment 90, the contact portion 41 of the locking key 40 abuts on the circumferential portion of the counterpart connector of the electronic equipment 90 and is pushed and moves in the directions approaching the medium 80 (that is, inserting and removing directions of the USB connector 20). Because of the above movement of the locking key 40, the corner portion 80b of the medium 80 is held by the holding claw 42 of the locking key 40.

When the width of the medium 80 is 25 mm, it is possible to fully prevent the medium 80 from being removed by setting the length of the first control face 42a of the locking key 40 to 1 mm and holding the medium 80.

After removing the USB connector 20 from the housing of the electronic equipment 90, it is possible to remove the medium 80 from the housing of the card reader 100 by moving the locking key 40 in the direction separating from the medium 80 (that is, inserting direction of the USB connector 20) and releasing the medium 80 held by the holding claw 42 of the locking key 40.

A case is described above in which two sides of the medium 80 are held by the holding claw 42 of the locking key 40 in accordance with the shape of the corner portion 80b of the medium 80. However, it is also allowed to use a configuration in which only one curved side 80a of the medium 80 is held by the locking key 40.

According to the card reader 100 of this embodiment described above, after the USB connector 20 of the card reader 100 is inserted into the housing of the electronic equipment 90, the locking key 40 moves toward the medium 80 by being pushed by the circumferential portion of the counterpart connector of the electronic equipment 90, the medium 80 is held by the locking key 40, and thereby it is impossible to remove the medium 80. Therefore, hot plug of the medium 80 is inhibited and the data in the medium 80 and the medium 80 are prevented from being broken.

(Second Embodiment)

FIGS. 3A and 3B are top views showing a card reader 200 of second embodiment of the present invention. FIG. 3A shows a state in which the card reader 200 is not set to the electronic equipment 90 and FIG. 3B shows a state in which the card reader 200 is set the electronic equipment 90. A portion common to the portion of the card reader 100 of the first embodiment shown in FIG. 1 is provided with the same symbol and its detailed description is omitted.

An urging member 46 urges the locking key 40 in the direction separating the locking key 40 from the medium 80 (that is, inserting direction of the USB connector 20). When the USB connector 20 is removed from the housing of the electronic equipment 90, the locking key 40 is moved in the direction separating from the medium 80 (inserting direction of the USB connector 20) due to urging by the urging member 46 and the medium 80 held by the holding claw 42 of the locking key 40 is released.

Figure 4:
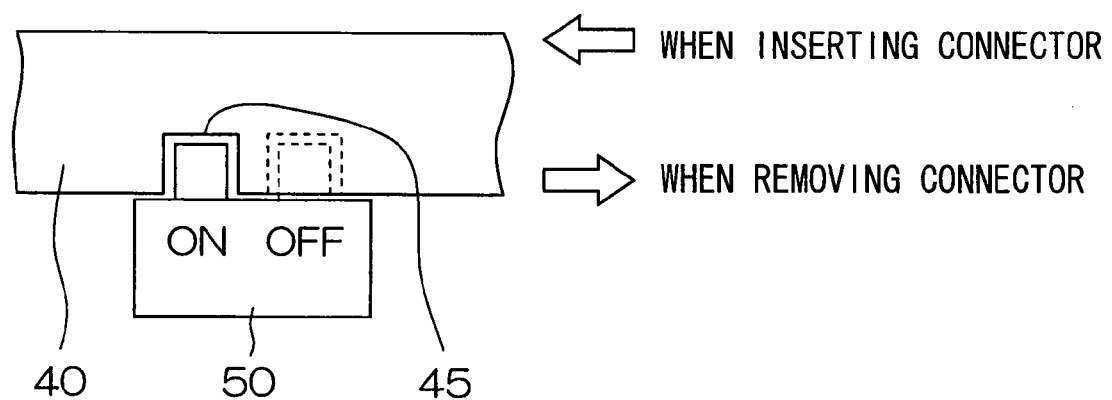
FIG. 4 is an illustration which explains medium lock detection.

As shown by an example in FIG. 4, a medium lock detecting portion 50 is constituted by a switch which detects lock of the medium 80 by the locking key 40 and lock cancel of the medium 80. When the USB connector 20 is inserted into the housing of the electronic equipment 90, the locking key 40 moves in the directions approaching the medium 80 (that is, inserting and removing directions of the USB connector 20) and the switch is turned on by a concave portion 45 of the locking key 40. Moreover, when the USB connector 20 is removed from the electronic equipment 90, the locking key 40 moves in the direction separating from the medium 80 (inserting direction of the USB connector 20) and the switch is turned off by the concave portion 45 of the locking key 40.

Figure 5:
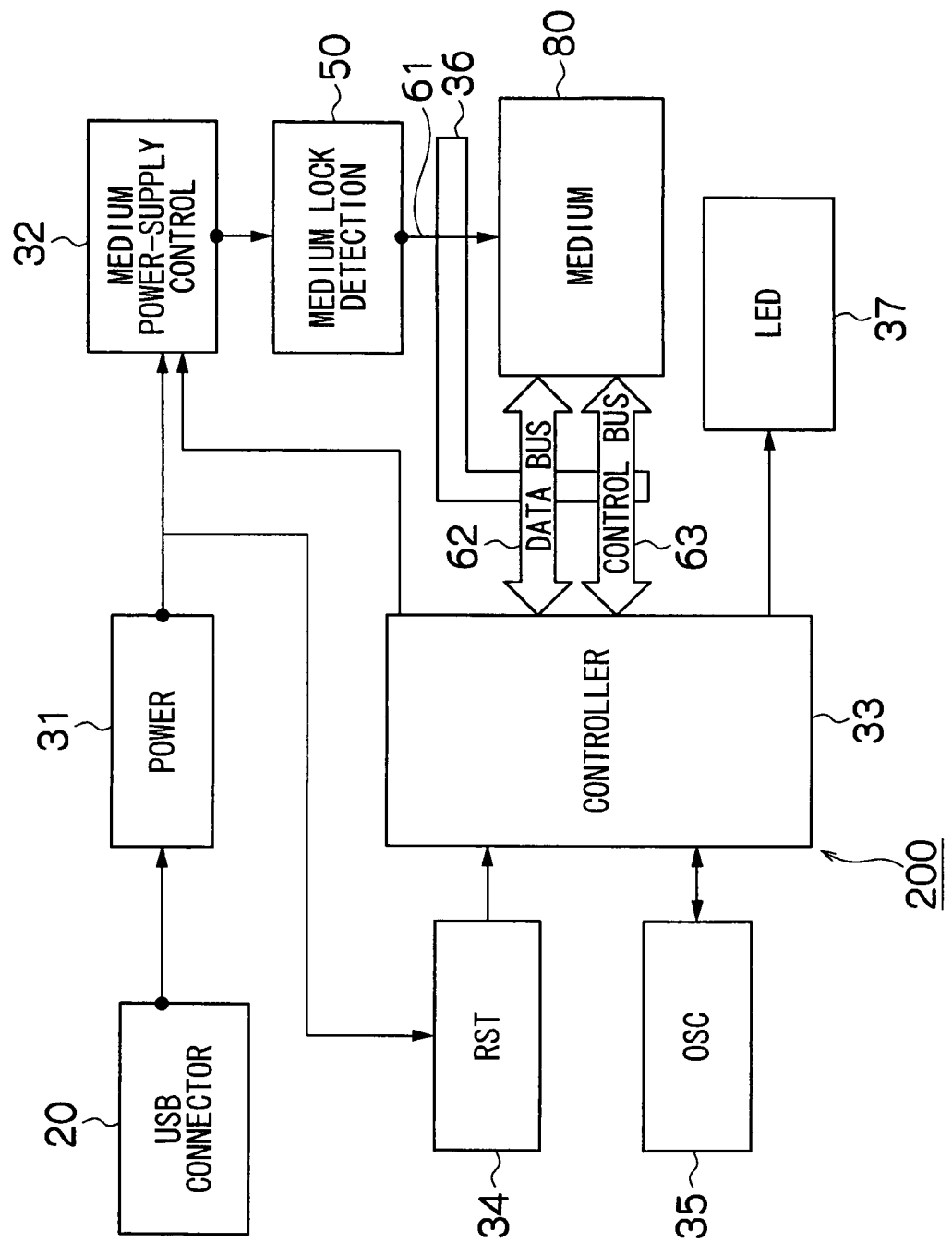
FIG. 5 is a block diagram of an essential portion of a card reader constituted so as to detect the locked state and lock cancelled state of a medium and supply power to the medium in the locked state.

FIG. 5 is a block diagram of an essential portion showing a first example of the internal configuration of the card reader 200. In the case of the first example shown in FIG. 5, the medium lock detecting portion 50 is set between a medium power-supply control circuit 32 and a medium connecting portion 36. The medium lock detecting portion 50 makes the medium power-supply control circuit 32 supply power to the medium 80 in the locked state and stops power supply from the medium power-supply circuit 32 to the medium 80 in the lock cancelled state.

Figure 3:
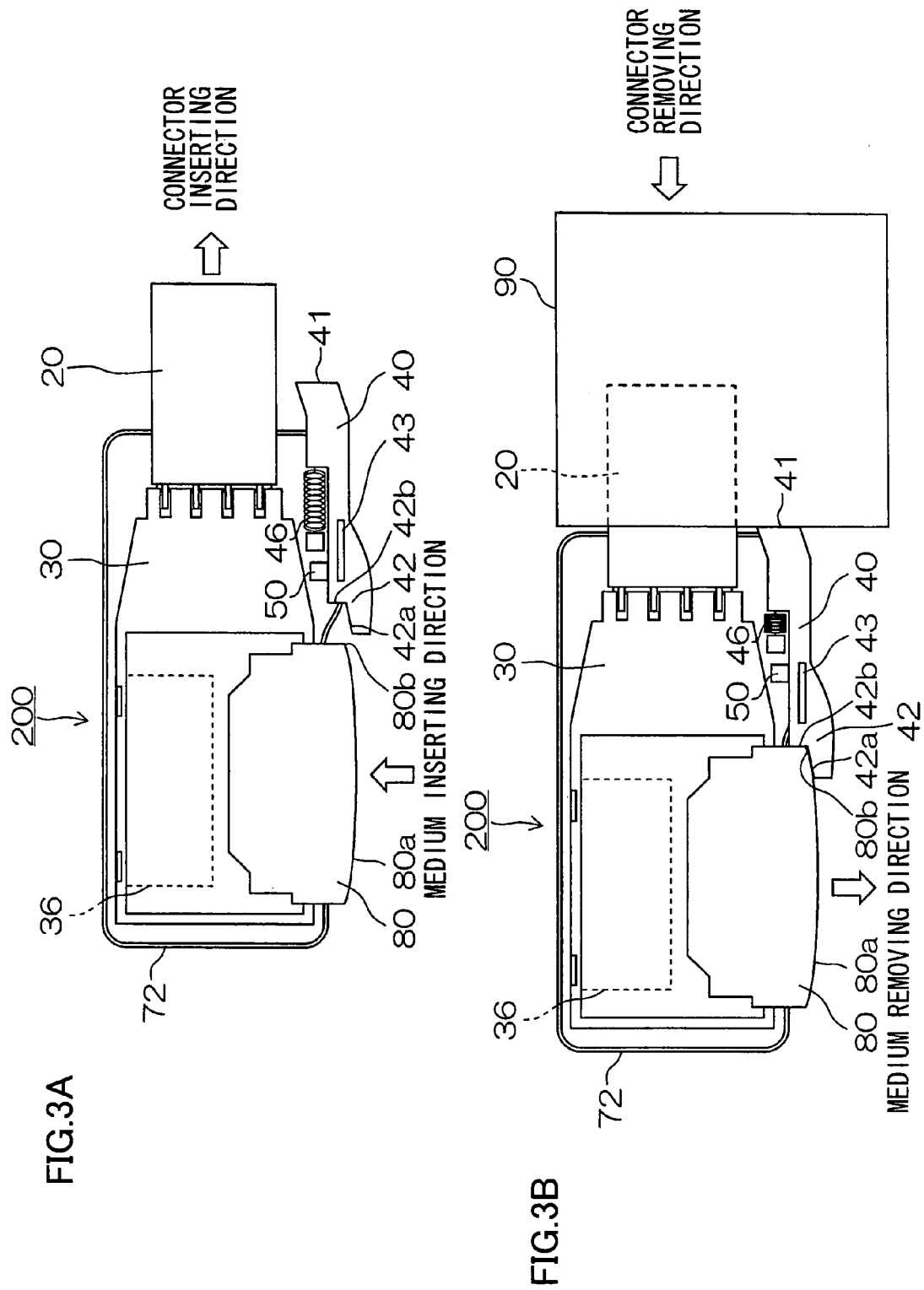
FIGS. 3A and 3B are top views showing a card reader of second embodiment of the present invention.

In FIG. 5, the following are set on the circuit board 30 in FIG. 3: a power supply circuit 31 which performs constant voltage control of the power supplied from the electronic equipment 90, a medium power-supply control circuit 32 which controls supply of power to the medium 80, a controller 33 which performs the control relating to an access to the medium 80 or the like, a resetting circuit 34 which resets the controller 33 when the USB connector 20 is inserted into the electronic equipment 90, an oscillator 35 which generates a timing signal necessary for an operation of the controller 33, and a medium connecting portion 36 constituted by a plurality of connection terminals to be electrically connected with the medium 80. Moreover, an LED 37 is set to a cover so that a user can visually confirm that the LED 37 is turned on/off.

Operations of the card reader 200 constituted as shown in FIG. 5 are described below.

When the USB connector 20 of the card reader 200 is inserted into the housing of the electronic equipment 90 and connected to the counterpart connector of the electronic equipment 90, the contact portion 41 of the locking key 40 contacts with the circumferential portion of the counterpart connector of the electronic equipment 90 and is pushed and the locking key 40 moves in the direction approaching the medium 80 (removing direction of the USB connector 20). Therefore, the state shown in FIG. 3A is changed to the state shown in FIG. 3B and the corner portion 80b of the medium 80 is held by the holding claw 42 of the locking key 40. Moreover, supply of power from the electronic equipment 90 to the power supply circuit 31 is started through the USB connector 20, a resetting signal is output from the resetting circuit 34 to the controller 33, and a power supply enabling signal is output from the controller 33 to the medium power-supply control circuit 32. Furthermore, the medium lock detecting section 50 detects the locked state of the medium 80 and is turned on and power is supplied from the medium power-supply control circuit 32 to the medium 80 through a power supply line 61.

Thus, when the USB connector 20 is inserted into the housing of the electronic equipment 90 and the medium 80 is locked by the locking key 40, it is possible to access the medium 80. That is, it is possible to read data from the medium 80 by using a control bus 63 and a data bus 62 in accordance with a timing signal generated by the oscillator 35. Moreover, it is possible to write data in the medium 80. During the access to the medium 80, the LED 37 is turned on and when the access to the medium 80 is completed, the LED 37 is turned off.

When the USB connector 20 of the card reader 200 is removed from the electronic equipment 90, the locking key 40 is urged by the urging member 46 and moves in the direction separating from the medium 80 (inserting direction of the USB connector 20). The medium lock detecting portion 50 detects the lock cancelled state and is turned off and supply of power from the medium power-supply control circuit 32 to the medium 80 is stopped by the medium lock detecting portion 50. The state shown in FIG. 3B is changed to the state shown in FIG. 3A, the medium 80 held by the holding claw 42 of the locking key 40 is released, and the medium 80 can be removed.

Figure 6:
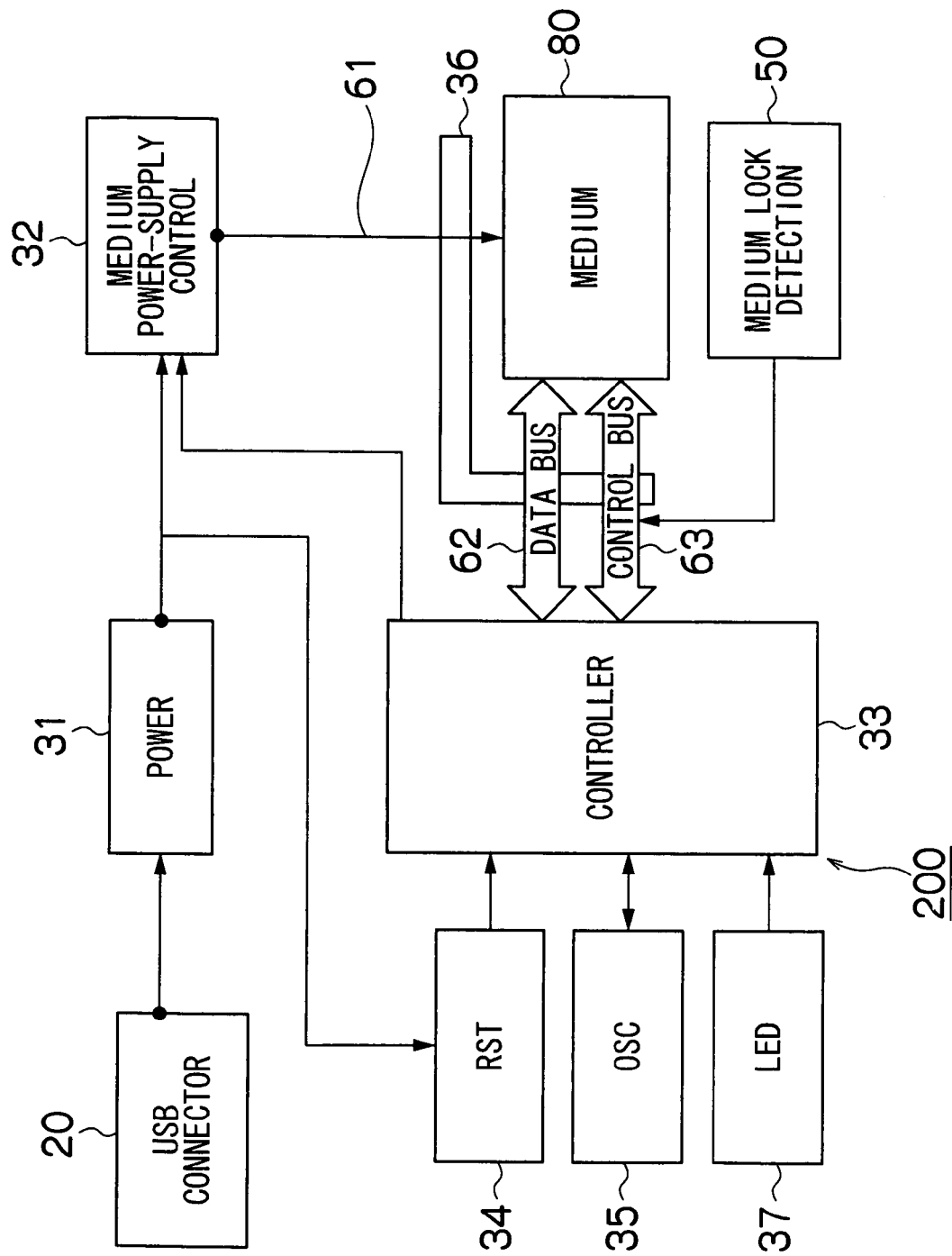
FIG. 6 is a block diagram of an essential portion of a card reader constituted so as to detect the locked state and lock cancelled state of a medium and electrically connect a control bus in the locked state.

FIG. 6 is a block diagram of an essential portion showing a second example of the internal configuration of the card reader 200. In the case of the second example shown in FIG. 6, the medium lock detecting portion 50 electrically connects the control bus 63 which controls an access to the medium 80 in the locked state and electrically disconnects the control bus 63 to stop access in the lock cancelled state.

Operations of the card reader 200 constituted as shown in FIG. 6 are described below.

When the USB connector 20 of the card reader 200 is inserted into the housing of the electronic equipment 90 and connected to the counterpart connector of the electronic equipment 90, the contact portion 41 of the locking key 40 contacts with the circumferential portion of the counterpart connector of the electronic equipment 90 and is pushed and the locking key 40 moves in the direction approaching the medium 80 (removing direction of the USB connector 20). Therefore, the state shown in FIG. 3A is changed to the state shown in FIG. 3B and the corner portion 80b of the medium 80 is held by the holding claw 42 of the locking key 40. Moreover, supply of power from the electronic equipment 90 to the power supply circuit 31 is started through the USB connector 20, a resetting signal is output from the resetting circuit 34 to the controller 33, a power-supply enabling signal is output from the controller 33 to the medium power-supply control circuit 32, and power is supplied from the medium power-supply control circuit 32 to the medium 80 through the power supply line 61. Furthermore, the medium lock detecting portion 50 detects the locked state of the medium 80 and is turned on, the control bus 63 between the controller 33 and medium 80 is electrically connected by the medium lock detecting portion 50 to make an access to the medium 80 possible. Specifically, the control bus 63 is turned on by an analog switch of a CMOS.

Thus, when the USB connector 20 is inserted into the housing of the electronic equipment 90 and the medium 80 is locked by the locking key 40, it is possible to access the medium 80. That is, it is possible to read data from the medium 80 through the control bus 63 and data bus 62 in accordance with a timing signal generated by the oscillator 35. Moreover, it is possible to write data in the medium 80. The LED 37 is turned on during the access to the medium 80 but it is turned off when the access to the medium 80 is completed.

When the USB connector 20 of the card reader 200 is removed from the electronic equipment 90, the locking key 40 is urged by the urging member 46 and moved in the direction separating from the medium 80 (inserting direction of the USB connector 20). The medium lock detecting portion 50 detects the lock cancelled state and is turned off, the control bus 63 between the controller 33 and medium 80 is electrically disconnected by the medium lock detecting portion 50, and an access to the medium 80 is inhibited. Specifically, the control bus 63 is turned off by an analog switch of a CMOS. Moreover, the state shown in FIG. 3B is changed to the state shown in FIG. 3A, the medium 80 held by the holding claw 42 of the locking key 40 is released, and the medium 80 can be removed.

(Third Embodiment)

Figure 7A:
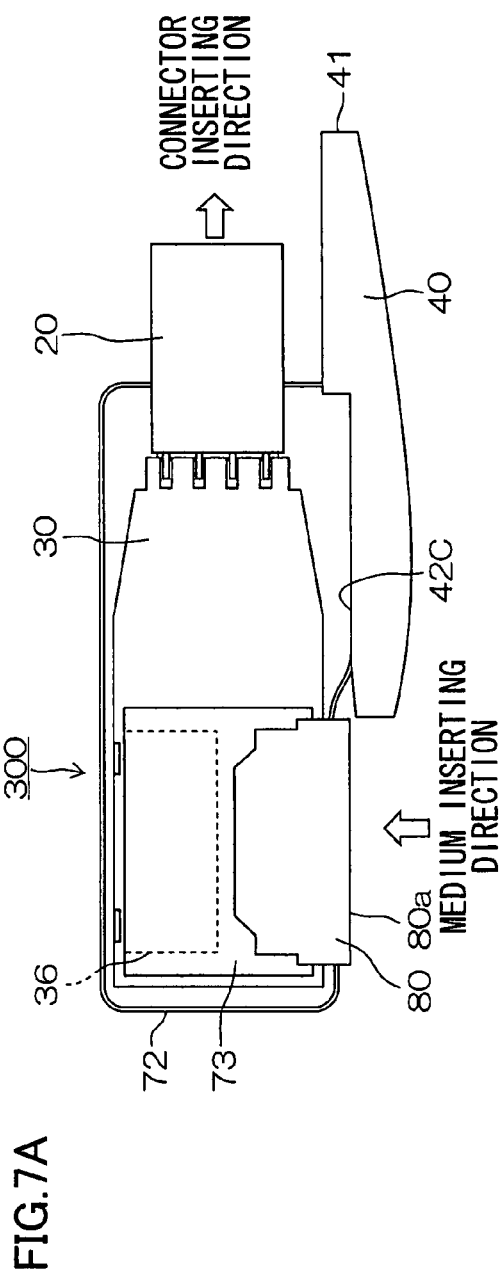
FIGS. 7A and 7B are top views showing a card reader of third embodiment of the present invention.
Figure 7B:
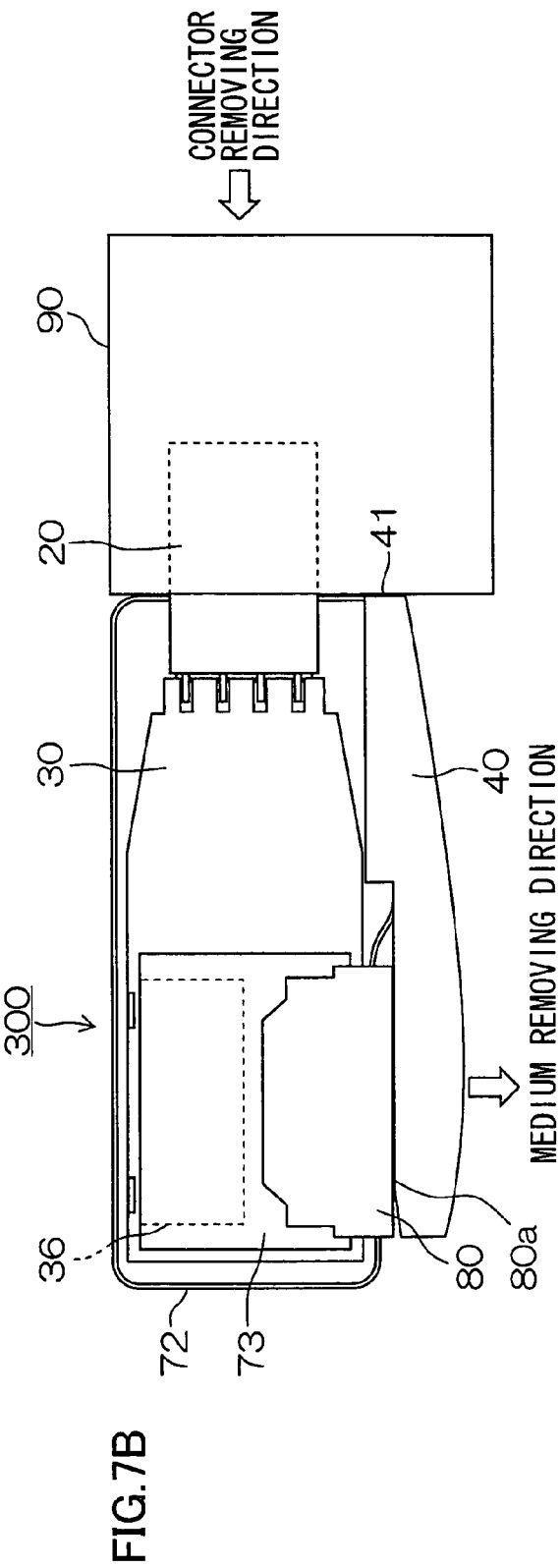

FIGS. 7A and 7B are top views showing a card reader 300 of the third embodiment of the present invention. FIG. 7A shows a state in which the card reader 300 is not set to the electronic equipment 90 and FIG. 7B shows a state in which the card reader 300 is set to the electronic equipment 90. A portion common to the portion of the card reader 100 of the first embodiment shown in FIG. 1 is provided with the same symbol and its detailed description is omitted.

The card reader 300 of the third embodiment is different from the card reader of the first embodiment in that the locking key 40 entirely covers one side 80a of the medium 80 when the USB connector 20 is inserted into the housing of the electronic equipment 90. One side 80a covered with the locking key 40 is flat and the opposing face 42c of the locking key 40 is also formed to be flat.

Moreover, though the urging member 46 and medium lock detecting portion 50 shown in FIG. 3 are omitted in FIG. 7, it is allowed to urge the locking key 40 by the urging member 46 and detect the locked state and lock cancelled state by medium lock detecting portion 50 as in the second embodiment. Furthermore, it is allowed to control the power supply line 61 to the medium 80 or the control bus 63 by using the internal configuration shown in FIG. 5 or 6.

Furthermore, for the first to third embodiments, a case is described in which the locking key 40 for holding a corner portion or one side of the medium 80 is used as a moving device of the present invention. However, the moving device of the present invention is not restricted to the locking key 40. For example, by using a configuration of covering the medium 80 with a lid when setting the medium 80, it is also allowed to prevent the medium 80 from being removed by locking the lid. Moreover, it is allowed to prevent the medium 80 from being removed when a plurality of members interlock with each other by constituting a moving member as a part of a locking mechanism constituted by the above members.

Though a case is described in which an interface with an electronic equipment uses a USB, the same advantage is obtained also by applying the present invention to a case in which the interface with the electronic equipment uses an interface other than the USB such as a SCSI (Small Computer System Interface).

What is claimed is:

1. A card reader, comprising:
   an external connector for connecting the card reader to an external device;
   a moving member which is movably attached to a housing of the card reader, said moving member moving in directions defined by insertion and removal of the external connector with respect to the external device, wherein the moving member moves by being pushed by a circumferential portion of a counterpart connector of the external device when the external connector is inserted to prevent a medium which is set in the housing from being removed.

2. The card reader according to claim 1, wherein the moving member prevents the medium from being removed by engaging a corner portion or one side of the medium.

3. The card reader according to claim 1, further comprising: an urging device which urges the moving member in the direction of insertion of the external connector, wherein the moving device moves by being urged by the urging device when the connector is removed, thereby allowing the medium set in the housing to be removed.

4. The card reader according to claim 3, further comprising:
   a medium lock detecting portion which detects a locked state and a lock cancelled state of the medium by the moving member and connects a power supply line to the medium in the locked state and disconnects the power supply line to the medium in the lock cancelled state.

5. The card reader according to claim 3, further comprising:
   a medium lock detecting portion which detects the a locked state and a lock cancelled state of the medium by the moving member and electrically connects a control line which controls an access to the medium in the locked state and electrically disconnects the control line in the lock cancelled state.

* * * * *